Feb. 11, 1936.   R. B. POOLE   2,030,074
UNIVERSAL JOINT
Filed Oct. 7, 1935   2 Sheets-Sheet 1
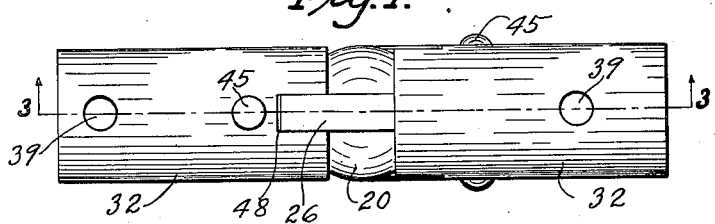
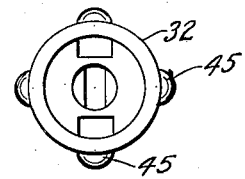
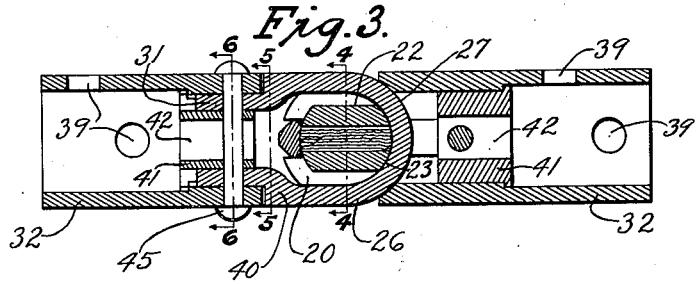
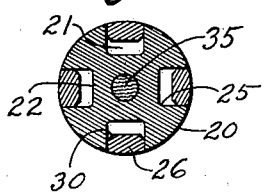
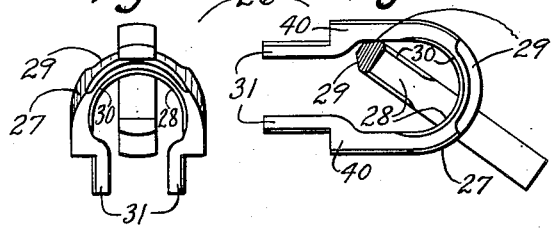
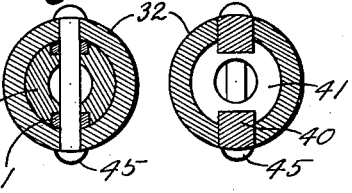
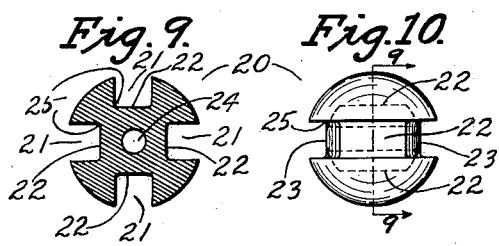
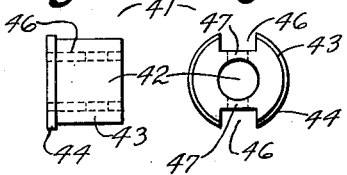
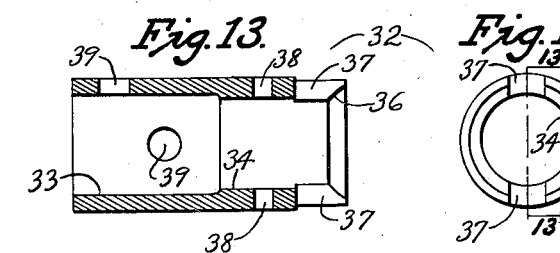
INVENTOR
ROY B. POOLE
By Frederick W. Cotterman
Att'y.

Feb. 11, 1936.    R. B. POOLE    2,030,074
UNIVERSAL JOINT
Filed Oct. 7, 1935    2 Sheets-Sheet 2
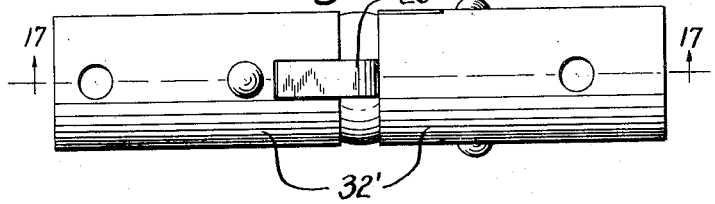
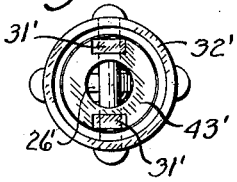
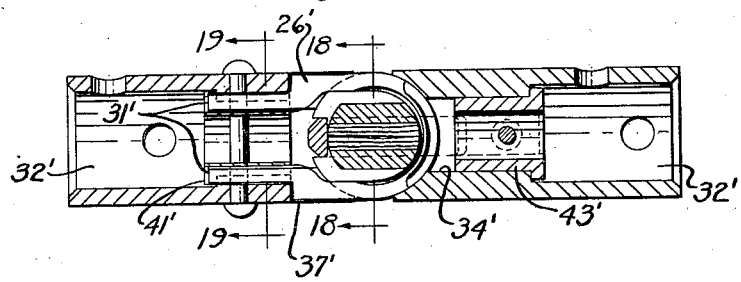
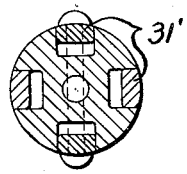
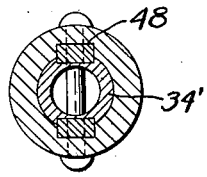
INVENTOR
ROY B. POOLE
BY Robert V. Laughlin
Clade Koontz
ATTORNEYS Patented Feb. 11, 1936

2,030,074

UNITED STATES PATENT OFFICE 2,030,074

UNIVERSAL JOINT

Roy B. Poole, Dayton, Ohio

Application October 7, 1935, Serial No. 43,839½

3 Claims. (Cl. 64—16)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to universal joints of the type used for transmitting rotative motion from one member to a second member when their axes of rotation are at an angle to each other in the same plane.

The object of the invention is to provide a universal joint of extreme lightness as compared to the power which it is capable of transmitting, together with certain safety features which render the joint less liable to failure than those now in common use, to the end that the joint may be particularly applicable to use in aircraft or similar service where lightness, strength and safety must be combined to an unusual degree.

That the foregoing object and many other meritorious features are attained will become apparent as the invention is described in detail and reference is made to the drawings, wherein, Fig. 1 is a full line view of my improved structure.

Fig. 2 is an end view.

Fig. 3 is a longitudinal axial section taken on the line 3—3 of Fig. 1.

Figs. 4, 5 and 6 are transverse sections taken through Fig. 3 at 4—4, 5—5 and 6—6 respectively.

Fig. 7 shows the U-shaped driving keys and their relative positions when the joint is driving at its maximum angle.

Fig. 8 is an end view of Fig. 7.

Fig. 9 is a transverse section through the connecting ball taken at 9—9 of Fig. 10.

Fig. 10 is a full line view of the connecting ball.

Fig. 11 is an elevation of the driving key locking collar.

Fig. 12 is an end view of Fig. 11.

Fig. 13 is a longitudinal axial section through one of the torque tubes taken at 13—13 of Fig. 14.

Fig. 14 is an end view f the torque tube Fig. 13.

Fig. 15 is a view similar to Fig. 1.

Fig. 16 is an end view of Fig. 15.

Fig. 17 is a view taken on the line 17—17 of Fig. 15.

Fig. 18 is a transverse sectional view taken on the line 18—18 of Fig. 17.

Fig. 19 is a transverse sectional view taken on the line 19—19 of Fig. 17.

Similar numerals refer to similar parts throughout the several views.

In the preferred embodiment of my invention which I show in Figs. 1 to 15 of the drawings, the connecting ball 20, shown in detail in the sectional view Fig. 9 and full view Fig. 10, has four keyways 21 equally spaced about its diameter. These keyways are provided by cutting two circular grooves entirely around the ball at right angles to each other. The four keyways are deepened at opposite sides of each circular groove by cutting four axially parallel flats 22 in the bottoms of the grooves. The bottoms of the grooves remain arcuate at the ends 23 where the depth of the circular grooves has not been increased. Small radii 25 are left in the bottom corners of the keyways to facilitate grinding. A hole 24 extends through the axis of the ball for an oil retaining wick 35, Fig. 4.

The U-shaped driving keys 26 which transmit the motion from one torque tube to another through the connecting ball 20 are shown in detail in Figs. 7 and 8. The two keys are here shown in the angular relation which they would assume when motion was being transmitted through the joint at maximum angle.

The closed end of the keys 26 on the outside at 27 conform to the curve of the outside of the ball 20, while on the inside at 28 they conform to the arcuate bottoms 23 of the keyways 21. The thickness of the keys 26 is such as to fit closely but slidably in the keyways 21. A portion of the closed end is beveled on the outside at 29 to increase the driving angle which the keys may assume relative to each other before the outside of one of the keys contacts the inside of the other. This will appear from Fig. 7.

A slight bevel 30 on the inside corners of the keys is provided to clear the radii 25 of the keyways 21 of the connecting ball. The open ends 31 of the keys are brought closer together for a purpose which will later appear.

The torque tubes 32 shown in detail in the axial section Fig. 13 and end view Fig. 14 are herein shown as being substantially the same outside diameter as the ball 20. A circular bore of one diameter 33 extends about halfway through and a slightly smaller bore 34 extends througn the remaining portion. The end of the tube has a spherical bevel 36 which conforms to the contour of the outside of the ball 20. Opposite end keyways 37 extend through the end of the tube. The width of keyways 37 is such as to fit the keys 26 tightly. Holes 38 and 39 are provided for purposes hereinafter described.

The driving key locking collar 41, shown in detail in Figs. 11 and 12 has a central hole 42 extending axially therethrough. The outside diameter 43 fits the bore 34 of the torque tube 32 snugly. The head 44 of the collar may conform substantially to the diameter of the bore 33. Opposite keyways 46 extend lengthwise in the outer surface of the collars. The open ends 31 of the driving keys 26 fit closely into the keyways 46. The outer circular contour of the ends 31 and the portion 43 of the collar correspond. Rivet holes 47 extend transversely through the collar in the bottoms of the keyways 46. The procedure followed in assembling the several parts is preferably about as follows:

The keys 26 are placed in the keyways 21 of the connecting ball 29 with the open ends 31 extending oppositely. The inside measurements of the ends 31 are preferably as much less than the distance across the flats 22 of the ball as the elasticity of the keys will permit, that is, the ends 31 are preferably sprung over the flats 22, but the dimensions should be such that the elastic limit of the material in the keys 26 is not exceeded in springing them over the flats.

The torque tubes 32 are next placed over the open ends of the keys with the ends 31 of the keys in the opening 34 of the tube, and the portions 40 of the keys in the slots 37 of the tubes. The portions 40 should preferably fit the slots 37 as closely as may be conveniently assembled.

The locking collars 41 are now inserted with the ends 31 of the keys in the keyways 46 of the collars. The depth of the keyways 46 and the dimensions of the ends 31 of the keys are preferably so made that when the collar 41 is pressed into place the ends 31 are clamped tightly against the bore 34 of the torque tube. The holes 42 in the locking collars are provided primarily for lightness but serve the further purpose of facilitating assembly, inasmuch as a tool of any convenient sort may be inserted through these holes against the closed ends 27 of the keys whereby the keys may be forced home with the interior surface 28 pressed tightly against the arcuate ends 23 of the ball.

By reference to Fig. 1 it will be seen that the dimensions of the keys 26 and the length of the slots 37 in the torque tube 32 are so made that there is still a slight gap 48 between the end of the part 40 of the keys and the bottoms of the slots when the structure is finally assembled. This gap is provided in order to insure that the keys 26 will bind the ball 20 so as to leave no axial lost motion.

With the parts assembled as described, the holes 38 in the torque tubes are extended through the ends 31 of the keys into the holes 47 of the locking collars. Rivets 45 are then put in place and the assembly is ready to be joined to hollow shafts or similar members which preferably extend into the openings 33 of the torque tubes. The holes 39 in the torque tubes are provided for admitting a fastening means for joining such members to the herein disclosed structure.

From the foregoing description it will be readily seen that the improved structure herein described has a number of advantages, for instance, the joint may be placed in axial tension without danger that the driving keys will be spread apart and sprung over the ball, as there is where driving keys are employed having the openings for assembly over the ball at the outer end of the keys. The manner of assembling the parts obviates axial lost motion without requiring that the parts be made with such extreme accuracy.

The manner in which the U-shaped driving keys are inserted and bound in the torque tubes provides a structure having unusual power transmitting capacity for its size and weight.

The modification of this invention, shown in Figs. 15 to 19, is the same as that shown in Figs. 1 to 14, except that the wall thickness at the adjacent ends of the tubes are increased by providing a smaller bore 34' than the corresponding bore 34 in Fig. 1 and the thickness of the driving key locking collar 43' correspondingly decreased by making the same smaller in outer diameter to provide additional internal keyways 48 that form a continuation of the keyways 37' in the tubes 33'. Also the open ends 31' of the keys 26' are preferably made rectangular in cross-section to correspond and snugly fit within the keyways 37'. The combined wall thicknesses of the tubes at the adjacent ends and of the driving key locking collar 41' is made substantially the same in this modification as in the above-described embodiment so as to obtain practically the same extent of angular displacement of the torque tubes, but by increasing the thickness of the walls of the tube additional bearing between the free ends 31' and tubes 32' is obtained and the torsional strength is improved practically fifty per cent. Experimental tests have proven this to be the case.

This application is a continuation in part of my co-pending application Serial No. 719,477, filed April 7, 1934.

I claim:

1. A joint structure comprising, two hollow tubes having their axes in the same plane but movable so that they are not in the same line, said tubes having keyways extending transversely across the walls at adjacent ends, a ball, held snugly between said adjacent ends, said ball having four keyways having axially parallel bottoms, two opposite bottoms being always parallel to the axis of one tube and the other two bottoms being always parallel to the axis of the other tube, and grooves having arcuate bottoms connecting the ends of opposite keyways together, two one-piece U-shaped keys having arcuate contours on their inner edges at the closed end fitted snugly to arcuate bottoms of the grooves and having parallel sides extending through said keyways, one key being at right angles to the other and their open ends extending oppositely, the parallel sides of said keys being offset inwardly midway of their length whereby the more widely spaced portion of the key sides extends into said transverse keyways and the offset portion extends into the hollow of said tubes, a spacing member within the hollow of said tubes grooved to receive the offset ends of said keys, and means to hold said spacing member and said keys in position in said tubes.

2. In a joint of the character described, a ball having a deep keyway extending around its periphery, the bottom of said keyway being circular except at opposite points where it is parallel to one axis of the ball, a one-piece U-shaped key in said keyway, the inner surface at the closed end of which is arcuate and fitted snugly to the circular portion of the bottom of the keyway, the sides of the U-shaped key near the free ends being offset inwardly whereby the space between said sides near the closed end conforms to said circular portion and the space between said sides near the free ends conforms substantially to the said parallel portion, a tubular member extending over the outside of the inwardly offset free ends, said tubular member having transverse slots in its ends extending over the wider portion of said sides, and means to hold said free ends positioned within said tubular member.

3. A joint structure comprising, two hollow tubes having their axes in the same plane but movable so that they are not in the same line, said tubes having keyways extending transversely across the walls at adjacent ends, a ball, held snugly between said adjacent ends, said ball having four keyways having axially parallel bottoms, two opposite bottoms being always parallel to the axis of one tube and the other two bottoms being always parallel to the axis of the other tube, and grooves having arcuate bottoms connecting the ends of opposite keyways together, two one-piece U-shaped keys having arcuate contours on their inner edges at the closed end fitted snugly to arcuate bottoms of the grooves and having parallel sides extending through said keyways, one key being at right angles to the other and their open ends extending oppositely, the parallel sides of said keys being offset inwardly midway of their length whereby the more widely spaced portion of the key sides extends into said transverse keyways and the offset portion extends into the hollow of said tubes, a spacing member within the hollow of said tubes grooved to receive the offset ends of said keys, said tubes having keyways extending transversely across and longitudinally internally of the walls at the adjacent ends to receive the open ends of said U-shaped keys and means for locking said keys to said tubes.

ROY B. POOLE.